(12) United States Patent
Khe et al.

(10) Patent No.: US 10,858,257 B2
(45) Date of Patent: Dec. 8, 2020

(54) METHODS FOR PRODUCING SMALL PARTICLES HAVING SUPER PORE SURFACE VIA NANO ENGRAVING PROCESS

(71) Applicant: HK INVESTMENT PRODUCTION TRADING, Ho Chi Minh (VN)

(72) Inventors: Nguyen Khe, Ho Chi Minh (VN); Hoai V. Linh, Ho Chi Minh (VN)

(*) Notice: Subject to any disclaimer, the term of this patent is extended or adjusted under 35 U.S.C. 154(b) by 679 days.

(21) Appl. No.: 15/437,344

(22) Filed: Feb. 20, 2017

(65) Prior Publication Data
US 2018/0237304 A1 Aug. 23, 2018

(51) Int. Cl.
| | |
|---|---|
| *B32B 9/00* | (2006.01) |
| *C01B 32/21* | (2017.01) |
| *C01B 32/23* | (2017.01) |
| *C01B 32/194* | (2017.01) |
| *B82Y 30/00* | (2011.01) |

(52) U.S. Cl.
CPC .......... *C01B 32/21* (2017.08); *C01B 32/194* (2017.08); *C01B 32/23* (2017.08); *B82Y 30/00* (2013.01); *C01B 2204/32* (2013.01); *C01P 2002/72* (2013.01); *C01P 2006/16* (2013.01); *Y10T 428/30* (2015.01)

(58) Field of Classification Search
CPC ........ Y10T 428/30; C01B 31/04; B82Y 30/00
USPC .......................................... 428/408; 423/448
See application file for complete search history.

(56) References Cited

U.S. PATENT DOCUMENTS

2016/0130151 A1* 5/2016 Kurungot ................ H01M 4/96
502/180

OTHER PUBLICATIONS

Garaj, Molecule-hugging graphene nanopores, PNAS Jul. 23, 2013 110 (3) pp. 12192-12196.*

* cited by examiner

*Primary Examiner* — Daniel H Miller
(74) *Attorney, Agent, or Firm* — Dale Jensen, PLC; Dale Jensen (57) ABSTRACT

Certain exemplary embodiments can provide a method that comprises engraving graphene to define super pores. The super pores have an average pore size less than approximately 0.5 nanometers. The graphene can comprise nano carbon. The graphene, when analyzed via X-Ray Diffraction results in major diffraction peaks at two theta of approximately 9.5 degrees, approximately 29 degrees, and approximately 44 degrees.

16 Claims, 9 Drawing Sheets

BET SPECIFIC SURFACE AREA (m2/g)

| Sample | SSA(m2/g) |
|---|---|
| VULCAN XR72C | 195 |
| Reduced Graphene Oxide (RGO from GRAPHENEA commercially available) | 500 |
| G4_201507_27_3 (normal GHC, not engraved) | 81 |
| G4_201508_43 (engraved GHC) | 792 |
| optimized engraved GHC | 1500 |
| aerogel SiO2 | 740 |

METHODS FOR PRODUCING SMALL PARTICLES HAVING SUPER PORE SURFACE VIA NANO ENGRAVING PROCESS

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method that comprises engraving graphene to define super pores. The super pores have an average pore size less than approximately 0.5 nanometers. The graphene can comprise nano carbon. The graphene, when analyzed via X-Ray Diffraction results in major diffraction peaks at two theta of approximately 9.5 degrees, approximately 29 degrees, and approximately 44 degrees.

Generally speaking, isolated particles show the power of adsorbing a large quantity of fluid, which fluid can comprise a melting solid, liquid, and/or gas. The tied adsorption helps to improve the charge exchange and the charge transfer between different materials. The tied adsorption is also the key factor for compatibility and/or dispersion of solid particles and/or solid elements in media.

The adsorption can occur by two mechanism: the first mechanism is chemisorption due to functional groups which can interact with surrounding environment. The second adsorption mechanism is physical adsorption due to the physical structure of the surface causing relatively weak bonding via Van der Waals forces. The pure semiconductor and conductor surface don't normally have chemisorption mechanism as they are very inert, thus they exhibits poor dispersion and poor compatibility with liquid media. However, their surface structure may give them large specific area and improve adsorption by physical mechanism. The physical adsorption power is related to specific surface area ("SSA"); the larger SSA indicates better adsorption efficiency and better interface effect in multilayer devices such as electrocatalysts, supercapacitors, batteries, and the like. Large SSA substances can be used in a variety of applications that comprise, for example, nanocarbon, semiconductor, nanowire, cosmetic powder, ceramic powder, zeolite, catalyst, pharmaceutical powder, fluid adsorbing solids, and/or gas adsorbent solids, etc.

Generally speaking, isolated particles can adsorb a relatively large quantity of fluid comprising a liquefied solid, liquid, and/or gas. Such adsorption can help to improve charge exchange and the charge transfer between different materials. The adsorption properties are related to the specific surface area ("SSA") of the particles. A larger SSA is indicative of better adsorption efficiency and a better interface effect in multilayer devices such as electro catalysts, supercapacitors, batteries, and the like. Particles having relatively large SSA can be found in certain embodiments of nano carbon, semiconductor, nano wire, cosmetic powder, ceramic powder, zeolite, catalyst, pharmaceutical powder, fluid adsorbing solids, and/or gas adsorbing solids, etc. Graphene has been known since 2002 and pioneering researchers received a Nobel Prize in Physics in 2010 for their research concerning graphene.

Since then, there is a lot of effort of making graphene having porous surfaces for multi-layer device applications. For example, U.S. Pat. Nos. 9,505,192 and 9,480,952 disclosed processes for making pores on atomically thin layers of materials such as graphene. U.S. Pat. Nos. 9,437,372, 9,482,638, 9,012,522, and 9,180,442 disclosed certain graphene processes and applications.

In U.S. Pat. No. 9,460,827, Khe et al. disclosed a new type of physically functionalized graphene, which was defined as a Graphene Hybrid Composite "GHC", which is a composite of graphene and multiwall carbon nanotubes (MWNTs). GHC can be made via a CVD process utilizing a solid carbon source. GHC can be a water soluble product or a water insoluble product and the process for making GHC is relatively environmentally friendly, as the process doesn't utilize hazardous oxidizers. Physically functionalized GHC can be produced in much larger scale than other products produced via a thin film process or graphene oxide ("GO") process.

Figure 1:
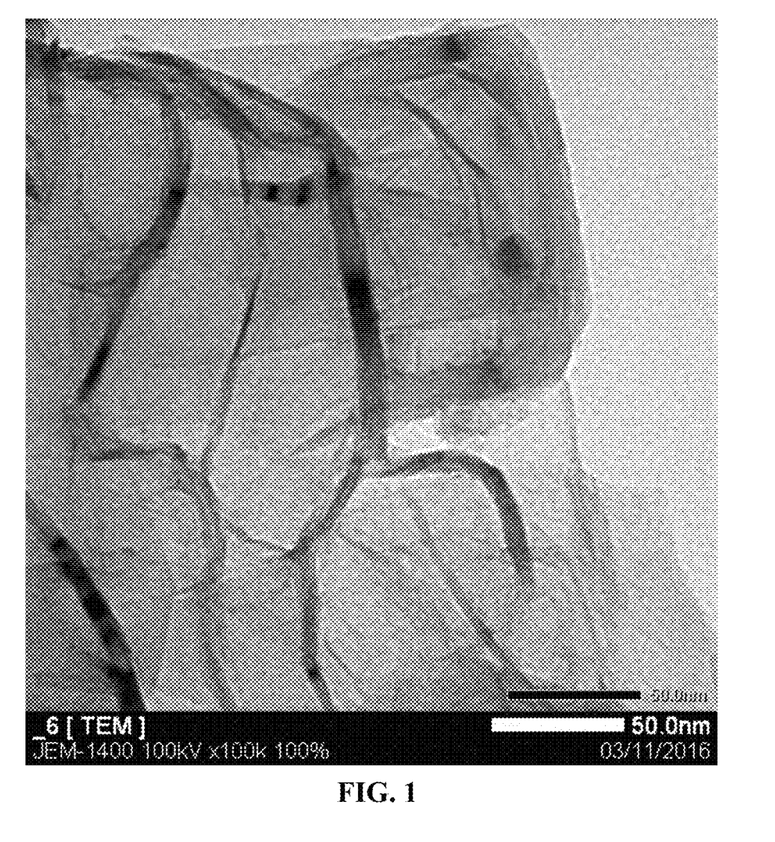
FIG. 1 is a transmission electron microscope ("TEM") image of an exemplary embodiment of GHC that has not been engraved in accordance with any exemplary process disclosed herein.
Figure 2:
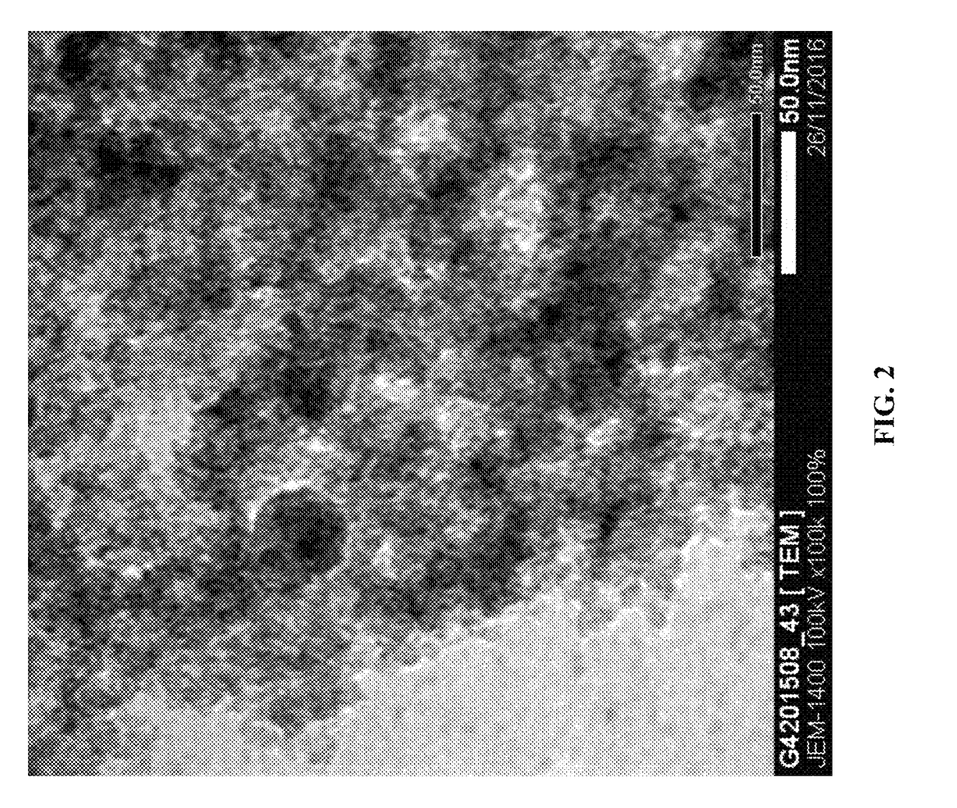
FIG. 2 is a TEM image of an exemplary embodiment of GHC that has been engraved in accordance with an exemplary process disclosed herein.

An exemplary GHC product shows smooth and flaky surface as shown in FIG. 1 with SSA value of approximately 81 $m^2/g$. However, in an exemplary embodiment, the nano engraving process can engrave the surface of the GHC to form an engraved surface having an SSA of up to approximately 792 $m^2/g$, which shows almost a ten fold improvement. FIG. 2 is a TEM image of engraved GHC and one can recognize the significant difference between normal GHC or non-engraved GHC and engraved GHC. The surface of engraved GHC comprises many nanopores having average size less than approximately 0.5 nm. Engraved graphene can:

- comprise at least one of thin film graphene, graphene hybrid composite, graphene nanoplatelet, graphene flower;
- when analyzed via X-Ray Diffraction results in major diffraction peaks at two theta values of approximately 9.5 degrees, approximately 29 degrees, and approximately 44 degrees; and/or
- has a BET specific surface area of greater than approximately 2000 square meters per gram, etc.

In another exemplary embodiment, the nano-engraving process can comprise step 1: incorporating the engraver molecule into the precursor of a GHC product;

step 2: growing the GHC at the same time with engraving; and/or step 3: finishing the GHC product and remove the engraver molecule off the product leaving behind a surface with stamp on it to give rise to engraved GHC.

In another exemplary embodiment, the engraver molecules are specially selected to increase SSA to a level greater than approximately 792 $m^2/g$ and up to approximately 991 $m^2/g$.

Figure 2A:
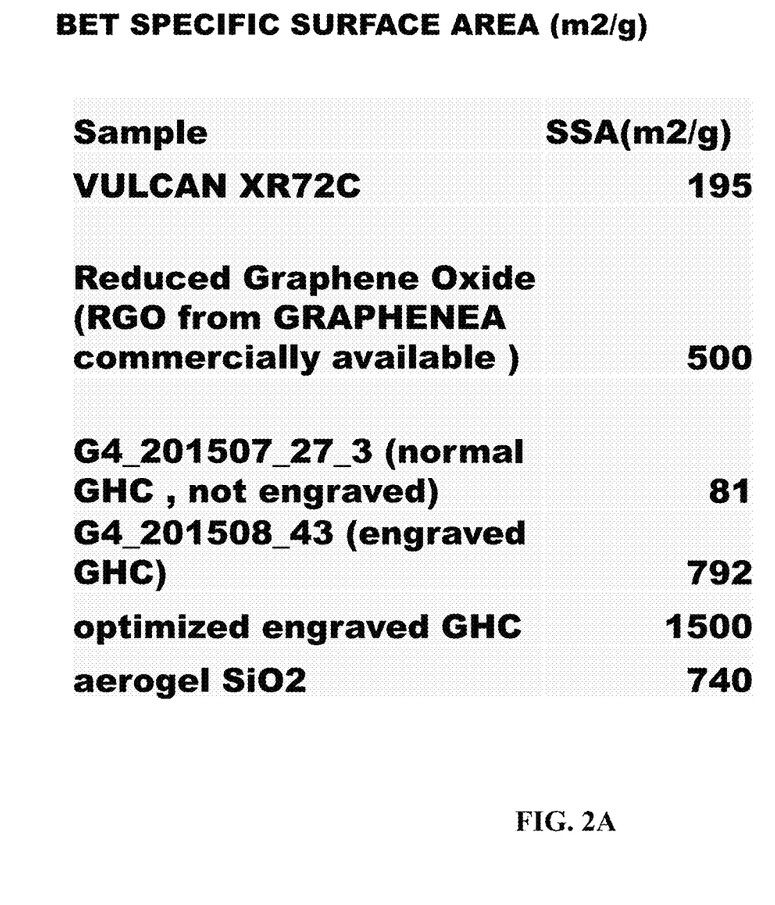
FIG. 2A is a BET surface area table of various substances including exemplary embodiments.

In another exemplary embodiment, the catalyst was specifically selected and optimized to cause an increase in SSA to approximately 1500 $m^2/g$. FIG. 2A is a summary of SSA data showing how engraving can increase the SSA of GHC. The engraving process on the surface of geminate GHC can be called a nanoengraving process, which can produce engraved GHC having a significantly increased SSA. FIG. 2A also shows the SSA value of several other powdered materials. These data verified the performance of an exemplary nanoengraving process as technique of generating materials having relatively large SSAs.

Figure 4:
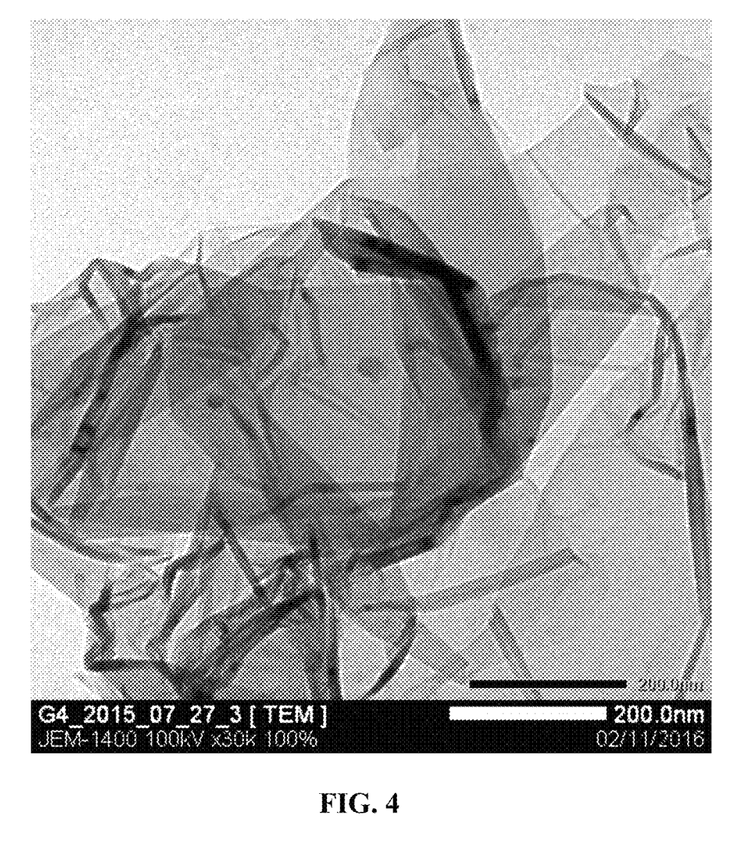
FIG. 4 is a TEM image of an exemplary embodiment of GHC that has not been engraved in accordance with any exemplary process disclosed herein.

In another exemplary embodiment, the engraved GHC shows an XRD chart as illustrated in FIG. 4 where one can recognize the diffraction peaks appeared at two theta values of approximately 9.5°, 29°, and 44°.

Figure 5:
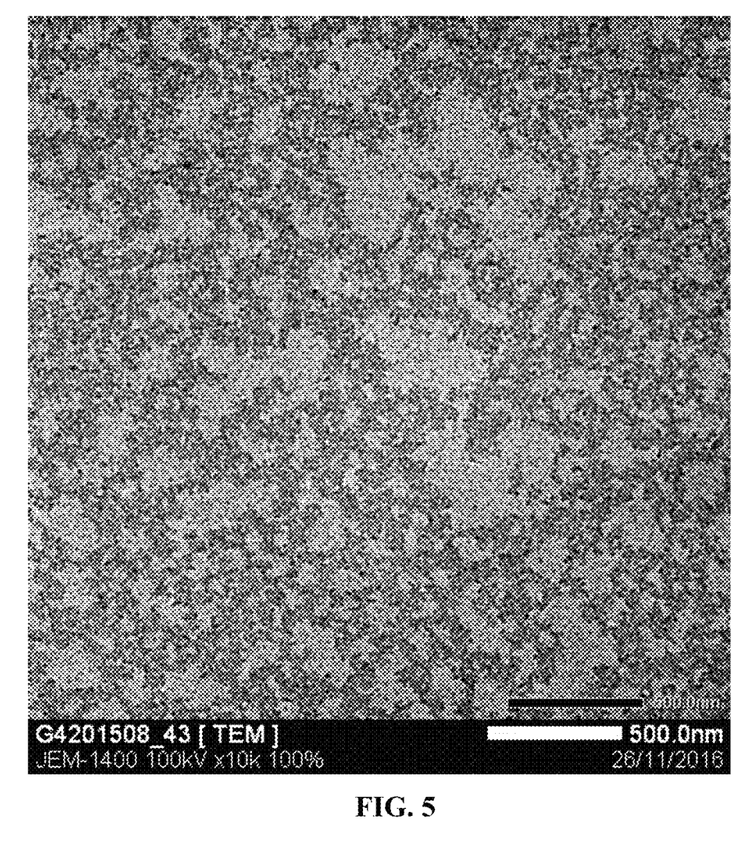
FIG. 5 is a TEM image of an exemplary embodiment of a GHC that has been engraved in accordance with an exemplary process disclosed herein.
Figure 6:
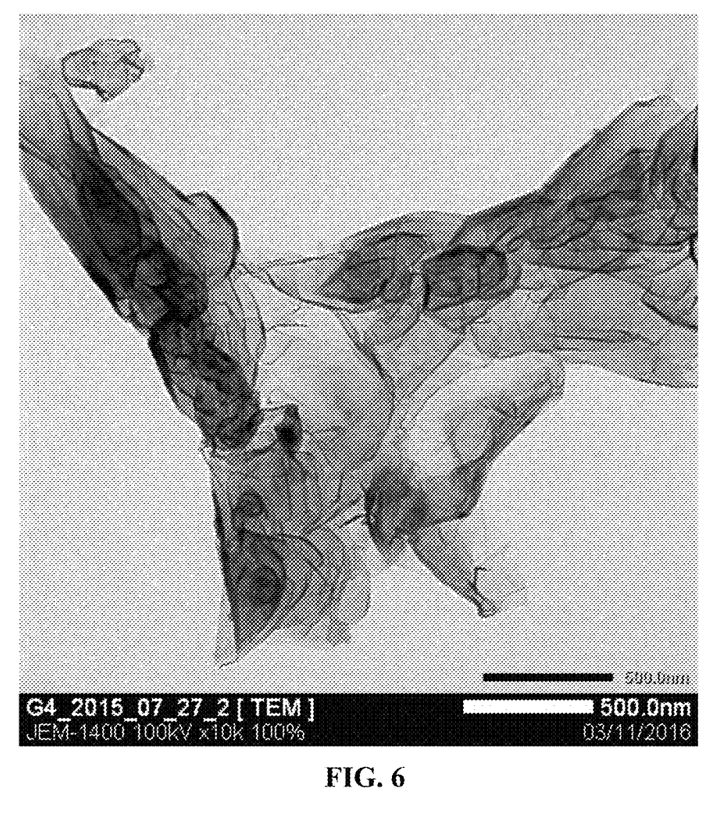
FIG. 6 is a TEM image of an exemplary embodiment of GHC that has not been engraved in accordance with any exemplary process disclosed herein.

In other exemplary embodiments, FIGS. 5-6 show differences between non-engraved GHC and engraved GHC.

An engraver molecule is a molecule, which can participate in growing GHC by reacting with a precursor. The engraver molecule can be precursor component or it can be on the surface of precursor. The engraver molecule can interact with the precursor, chemically and/or physically, to modify the physical structure of the surface of a particular GHC product.

In certain exemplary embodiments, an engraver molecule can comprise metal salts and/or hydroxide compounds of metals in I, II, III, IV, V group of the periodic table. Such metals can comprise Ca, Na, K, Zn, Mg, Al, Ga, In, Tl, As, Sb, Bi, Fe, Ti, Zr, and/or V, etc. Exemplary metal salts, oxides and hydroxides can comprise $FeCl_2$, $AlCl_3$, $FeCl_3$, $Fe_2(SO_4)_3$, $Fe(OH)_3$, $Fe_2(NO_3)_3$, $GaCl_3$, $InCl_3$, $AsCl_3$, $Tl(OH)_3$, $TiO_2$, $ZnO$, $V_2O_5$, $AsBr_3$, $SbCl_3$, $SbBr_3$, $TiCl_4$, isopropoxy titanium Ti(OPr)4. Metal organic and inorganic acid salts can comprise diazonium salts, iodonium salt, and/or thiopyryllium salt, etc.

In another exemplary embodiment, the engraver molecule can comprise a corrosion agent, reduction agent, and/or oxidation agent against precursor composition and left behind holes on the surface of the final product. Exemplary reduction agents can comprise $NaBH_4$, NaOH, and/or KOH, etc.

In another exemplary embodiment, the precursor can comprise a carbon source, metal catalyst, and/or engraver molecule, etc.

During a chemical vapor deposition ("CVD") process, carbon sources are thermally decomposed into free radical of carbon, which can be partially adsorbed on the surface of a catalyst. During the forming and growing of a carbon sheet, the engraver molecules can stamp in the surface of product in-situ and leave behind holes after engraver molecule prior to being removed off of the product. The nano engraving process can occur during the nano powder product forming by heat, light, or pressure under vacuum.

In an exemplary embodiment, the carbon source was selected from pinewood and $NiCl_2$ was selected as catalyst and $NaBH_4$ was selected as an engraver. The MWNT was observed as a product having an SSA of approximately 500 $m^2/g$ while MWNT of the same process without utilizing an engraver resulted in an SSA of approximately 180 $m^2/g$, which showed the effect of an engraver and nanoengraving.

FIG. 1 is a TEM image of an exemplary embodiment of GHC that has not been engraved in accordance with any exemplary process disclosed herein. The TEM image is on a 50 nm scale FIG. 2 is a TEM image of an exemplary embodiment of GHC that has been engraved in accordance with an exemplary process disclosed herein. The TEM image is on a 50 nanometer ("nm") scale.

FIG. 2A is a BET surface area table of various substances including exemplary embodiments; which shows BET specific surface area ("SSA") measurements in square meters ("$m^2$") per gram ("g") of certain nano carbon materials including engraved and unengraved GHC. The engraved surface exhibits an SSA that is approximately ten times greater than that of unengraved material. The engraver in the precursor had etched the surface of nano carbon products and left behind holes on the surface when the engraver is removed off the product.

Figure 2B:
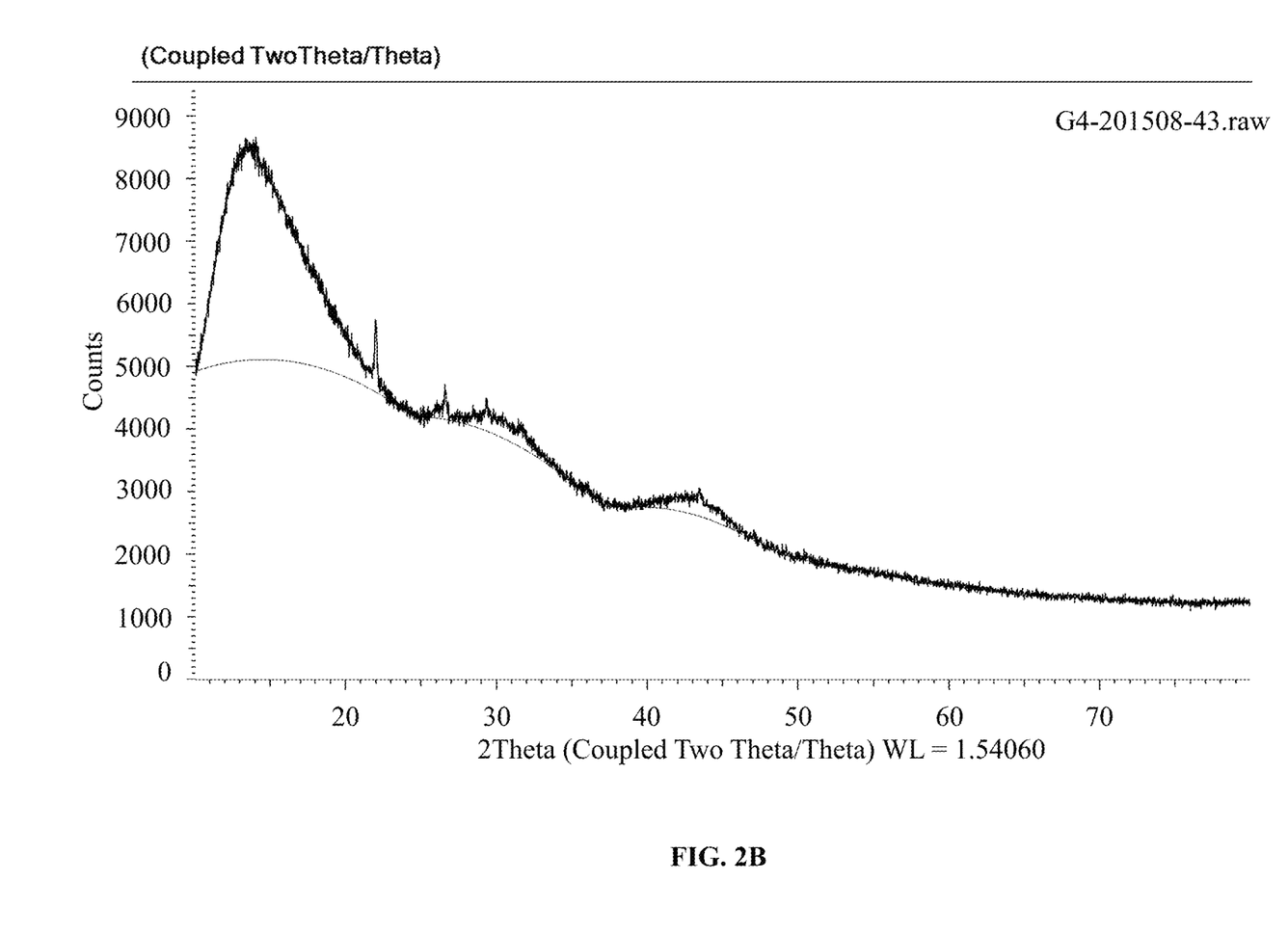
FIG. 2B is an X-Ray Diffraction chart of an exemplary sample of GHC that has been engraved in accordance with an exemplary process disclosed herein.
Figure 3:
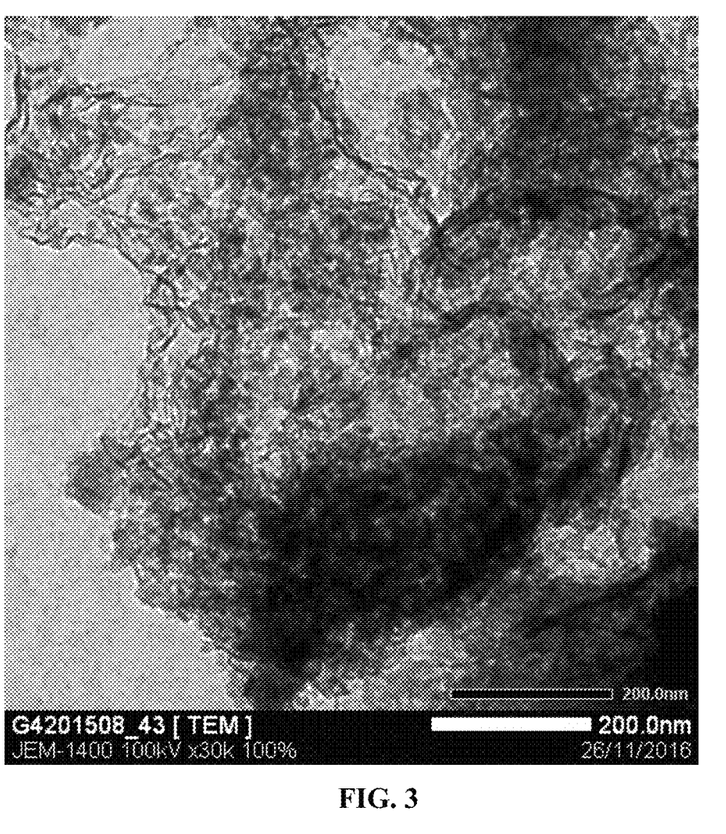
FIG. 3 is a TEM image of an exemplary embodiment of a GHC that has been engraved in accordance with an exemplary process disclosed herein.

FIG. 2B is an X-Ray Diffraction chart of an exemplary sample of GHC that has been engraved in accordance with an exemplary process disclosed herein FIG. 3 is a TEM image of an exemplary embodiment of a GHC that has been engraved in accordance with an exemplary process disclosed herein. The illustrated image shows a surface in which the engraver was embedded in the precursor. The TEM image is on a 200 nm scale.

FIG. 4 is a TEM image of an exemplary embodiment of GHC that has not been engraved in accordance with any exemplary process disclosed herein. The illustrated image shows a surface in which no engraver was embedded in the precursor. The TEM image is on a 200 nm scale.

FIG. 5 is a TEM image of an exemplary embodiment of a GHC that has been engraved in accordance with an exemplary process disclosed herein. The illustrated image shows a surface in which the engraver was embedded in the precursor. The TEM image is on a 500 nm scale.

FIG. 6 is a TEM image of an exemplary embodiment of GHC that has not been engraved in accordance with any exemplary process disclosed herein. The illustrated image shows a surface in which no engraver was embedded in the precursor. The TEM image is on a 500 nm scale.

In an exemplary of the embodiment, the process of making a porous surface can produce average pore size less than approximately one nm. FIG. 1 and FIG. 2 are respectively TEM images having a 50 nm scale of GHC products with and without engraver in a precursor used to make each. FIG. 3 and FIG. 4 are TEM images having a 200 nm scale of other GHC products respectively with (FIG. 3) and without (FIG. 4) an engraver in a precursor used to make each. FIG. 5 and FIG. 6 are TEM images having a 500 nm scale of other GHC products with (FIG. 5) and without (FIG. 6) an engraver in a precursor used to make each. From these TEM data, the pore size is observed to be approximately one nm or less.

An exemplary hole generation process using an engraver comprises:

incorporating engraver into a solid product precursor;

engraving a product surface via reaction of the engraver with the precursor during product formation; and removing the engraver off the product.

In order to facilitate engraving, the nano carbon such as GHC is synthesized using a specific catalyst selected from the metal salts and/or hydroxide compounds of metals of the II, III, IV, and V groups of the periodic table. Such metals can comprise Zn, Mg, Al, Ga, In, Tl, As, Sb, Bi, Fe, Ti, Zr, Sn, V, and the like. Exemplary metal salts, oxides and hydroxides can comprise $FeCl_2$, $SnCl_2$, $AlCl_3$, $FeCl_3$, $Fe_2(SO_4)_3$, $Fe(OH)_3$, $Fe(NO_3)_3$, $GaCl_3$, $InCl_3$, $AsCl_3$, $Tl(OH)_3$, $TiO_2$, $ZnO$, $V_2O_5$, $AsBr_3$, $SbCl_3$, $SbBr_3$, $TiCl_4$, and/or $SnCl_4$, etc.

The solid carbon sources can be selected from cellulose such as all kinds of rice flour and the like, wood particles, pine wood particles, paddy husks, beans, organic acids such as multifunctional carboxylic acid, and/or organic molecules, etc.

The engraver can be selected from gas and gas generating molecules such as those comprising $H_2$, $CO_2$, $N_2$, Ar, $CaCO_3$, $NaHCO_3$, and/or metal organic and inorganic acid salts, etc. Gas generation can occur by heat, light, and/or pressure. Particularly, diazonium salts can generate $N_2$ gas under illumination with ultraviolet ("UV") light.

In certain exemplary embodiments, the engraver can be a corrosion agent, reduction agent, and/or oxidation agent against precursor composition. The engraver leaves behind holes on the surface of the final product. An exemplary reduction agent is $NaBH_4$, which can react with a metal element to form $H_2$.

During an exemplary CVD process, carbon sources are thermally decomposed into free radicals of carbon, which can be partially adsorbed on the surface of a catalyst. During the forming and growing of an exemplary carbon sheet, the engraver molecules can engrave the surface of product in-situ and leave behind holes after the engraver molecule is removed off of the product. Nano engraving processes occur during the nano powder product formation via heat and/or light under vacuum conditions relative to atmospheric pressure.

Certain exemplary embodiments provide a product comprising a component. The component can comprise at least one of an electro catalyst, supercapacitor, or battery. The component can comprise engraved graphene having surface intentionally engraved to define super pores, the super pores having an average pore size less than approximately 0.5 nanometers. The engraved graphene can comprise nano carbon; wherein the graphene:
  when analyzed via X-Ray Diffraction, has major diffraction peaks at two theta of approximately 9.5 degrees, approximately 29 degrees, and approximately 44 degrees; and
  has a BET specific surface area of greater than approximately 2000 square meters per gram.

The engraved graphene can be at least one of a semiconductor, nano wire, cosmetic powder, ceramic powder, zeolite, catalyst, pharmaceutical powder, fluid adsorbing solid, and/or a gas adsorbent solid, etc. The nano carbon can comprise a graphene hybrid composite. The nano carbon can comprise at least one of graphene, graphene nano platelet, graphite, carbon nano tube, buckminsterfullerene, carbon black, diamond, and activated carbon.

Figure 7:
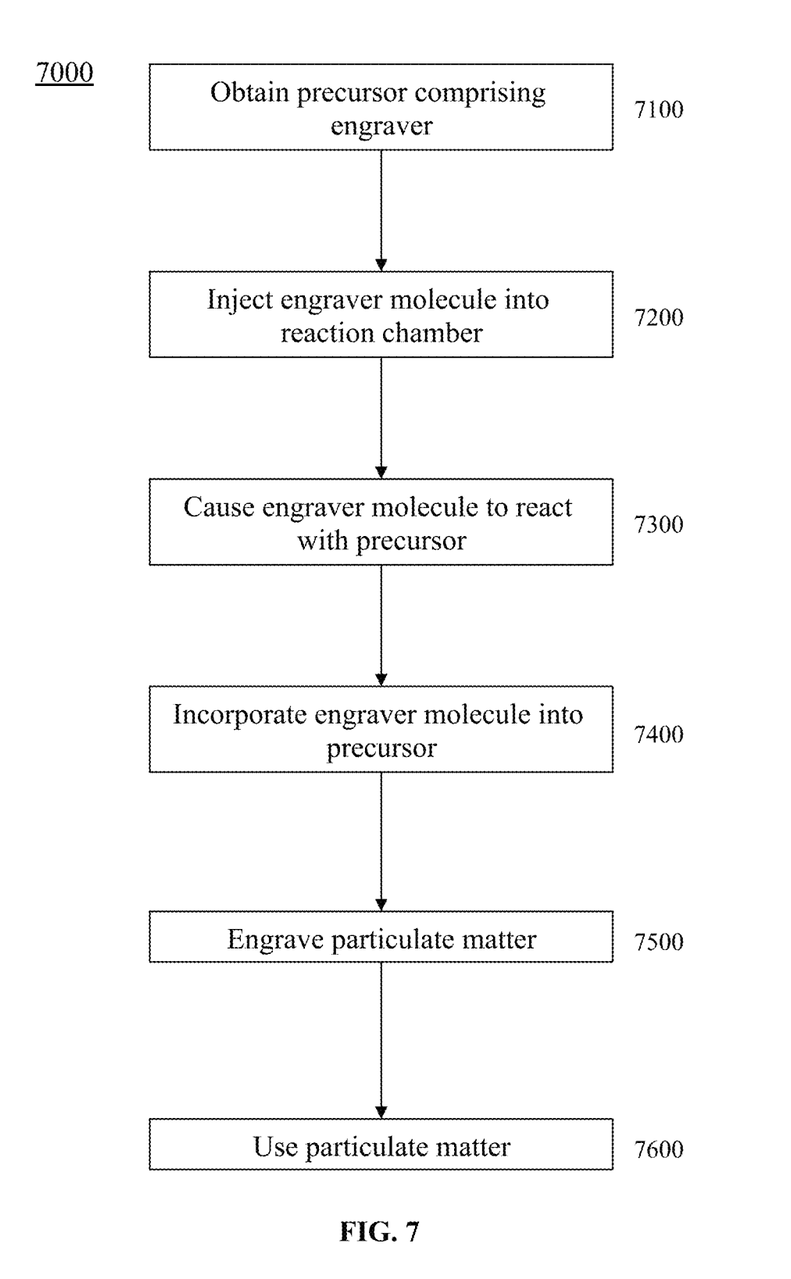
FIG. 7 is a flowchart of an exemplary embodiment of a method 7000.

FIG. 7 is a flowchart of an exemplary embodiment of a method 7000. At activity 7100, a precursor comprising an engraver for graphene and/or particulate matter can be obtained. The precursor can comprise a carbon source, a metal catalyst, and/or an engraver molecule, etc. At activity 7200, an engraver molecule can be injected into a reaction chamber. At activity 7300, the engraver molecule can be caused to react with the precursor. The engraver molecule can be caused to react with the precursor at a surface of the graphene and/or the particulate matter. At activity 7400, the engraver molecule can be incorporated into the precursor. The engraver molecule can be incorporated into the precursor of the graphene and/or the particulate matter prior to forming the graphene and/or the particulate matter.

At activity 7500, the graphene and/or the particulate matter can be engraved. The engraver molecule can react chemically or physically with a precursor to form the engraved graphene and/or the engraved particulate matter. The engraver molecule can be a metal salt. The graphene and/or the particulate matter can be engraved via at least one of a corrosion agent, reducing agent, oxidizing agent, gas, and gas forming molecule. The graphene and/or the particulate matter can be engraved via a gas forming agent that comprises at least one of a metal or an organic acid salt. The graphene and/or the particulate matter can be via a gas forming agent that comprises at least one of a metal or an organic acid salt. The graphene and/or the particulate matter can be via a gas forming agent that comprises organic acid salt that comprises a diazonium salt, an iodonium salt, or a thiopyrylium salt. The engraving step can cause a gas release under at least one of heat, light, or pressure. In certain exemplary embodiments, the engraving step produces hydrogen gas. The graphene and/or the particulate matter can be engraved to define super pores. The super pores have an average pore size less than approximately 0.5 nanometers. The graphene and/or the particulate matter can comprise nanocarbon. The graphene and/or the particulate matter, when analyzed via X-Ray Diffraction, has major diffraction peaks at two theta values of approximately 9.5 degrees, approximately 29 degrees, and approximately 44 degrees. The graphene has a BET specific surface area of greater than approximately 2000 square meters per gram. The engraver molecule can be removed from the engraved graphene and/or the engraved particulate matter after the engraving has been completed.

At activity 7600, the graphene and/or the particulate matter can be used. Method 7000 can produce a catalyst and/or an electrocatalyst. Method 7000 can produce particles used in a battery electrode. The engraved graphene and/or the engraved particulate matter can be used to provide a charge transfer interface for a multi-layer device. The multi-layer device can be a fuel cell, solar cell, supercapacitor, or lithium ion battery. The engraved graphene can be used as nano-filler to reinforce polymer matrix such as rubber tree latex for tires. The engraved graphene can be used as nano-filler to form an alloy with metals, ceramic, and/or wood for mechanical reinforcement of the host materials. The engraved graphene can be used in a combination with other nano-reinforcement fillers such as MWNT, SC composite, aerogel silica, silica hydrogel to enhance the mechanical reinforcement effect for materials such as but not limited to rubber tires, aerospace components, cars, and/or buildings, etc.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.
  a—at least one.

acid—a molecule or ion capable of donating a hydron (proton or hydrogen ion H+), or, alternatively, capable of forming a covalent bond with an electron pair.
activated carbon—charcoal that has been heated or otherwise treated to increase its adsorptive capacity.
activity—an action, act, step, and/or process or portion thereof
aerogel silica—a synthetic porous ultralight material derived from a gel, in which the liquid component of the gel has been replaced with a gas. The result is a solid with extremely low density and low thermal conductivity.
and/or—either in conjunction with or in alternative to.
apparatus—an appliance or device for a particular purpose.
article—a particular item or object.
associate—to join, connect together, and/or relate.
average—a number expressing a central or typical value in a set of data, in particular the mean, which is calculated by dividing the sum of the values in the set by their number.
battery electrode—an electrical conductor used to make contact with a nonmetallic part of an electrochemical cell, wherein the electrochemical cell is adapted to convert chemical energy to electrical energy.
BET specific surface area—a measurement of an absorption capability of an exposed portion of a substance, the measurement is named after the researchers Brunauer, Emmett, and Teller.
buckminsterfullerene—a form of carbon having molecules of 60 atoms arranged in a polyhedron resembling a geodesic sphere.
building—a structure with a roof and walls, such as a house, school, store, or factory.
can—is capable of, in at least some embodiments.
carbon black—a fine particulate form of carbon powder used as a pigment, made by burning hydrocarbons in insufficient air.
carbon source—a substance that provides carbon to synthesize graphene.
catalyst—a chemical that accelerates chemical reaction.
cause—to produce an effect.
cellulose—an insoluble substance that is the main constituent of plant cell walls and of vegetable fibers such as cotton.
ceramic—a material made of clay and hardened by heat.
ceramic powder—fine particles of an inorganic, nonmetallic solid material comprising metal, nonmetal or metalloid atoms primarily held in ionic and covalent bonds.
charge accumulative material—a substance that is able to store an electrical potential difference between a first portion of the substance and the second portion of the substance.
charge transfer interface—a boundary between two substances across which electrons move.
chemical stability—when a system is in substantial chemical equilibrium with its environment.
chemically—via a chemical reaction.
comprising—including but not limited to.
configure—to make suitable or fit for a specific use or situation.
constructed to—made to and/or designed to.
convert—to transform, adapt, and/or change.
corrosion agent—a substance that causes destruction by chemical action.
cosmetic powder—a substance comprising fine particles that is used to attempt to enhance beauty.
crack—to break without a complete separation of the parts.
create—to bring into being.
curer—to vulcanize (rubber).
define—to establish the outline, form, or structure of
device—a machine, manufacture, and/or collection thereof.
diamond—a stone comprising substantially pure carbon, having an optically translucent crystalline form, and being the hardest naturally occurring known substance.
diazonium—a group of organic compounds sharing a common functional group $R-N_2^+X^-$ where R can be any organic group, such as an alkyl or an aryl, and X is an inorganic or organic anion, such as a halogen.
dissolution—a process by which two substances form a solution.
durability—an ability to withstand wear, pressure, or damage.
electrocatalyst—a chemical that accelerates an electrochemical reaction.
engrave—to carve or etch a material in a manner that increases surface porosity.
fine particles—solids that have a maximum dimension between 100 and 2,500 nanometers.
fluid absorbing solid—a particulate substance into which atoms, molecules or ions of a liquid enter.
form—to make something.
fuel cell—a device that converts the chemical energy from a fuel into electricity through a chemical reaction of positively charged hydrogen ions with an oxidizing agent.
functional group—a group of atoms responsible for the characteristic reactions of a particular compound.
gas—a fluid substance, which expands freely to fill any space available, irrespective of its quantity.
gas absorbing solid—a particulate substance upon a surface of which atoms, molecules or ions of a gas are held.
gas forming agent—an element or compound that causes generation of a gas.
generate—to create, produce, give rise to, and/or bring into existence.
graphene—an allotrope of carbon in the form of a two-dimensional, atomic-scale, hexagonal lattice in which one atom forms each vertex.
graphene—solids that comprise only fine particles or nano particles that comprise a partially substantially planar surface.
graphene flower—graphene synthesized in a manner that causes the graphene to have an appearance similar to a flower immediately after synthesis.
graphene hybrid composite—a substance comprising graphene as described in U.S. Pat. No. 9,460,827, which substance comprises carbon nanotubes.
graphite—a gray, crystalline, allotropic form of carbon.
heat—added or external energy that causes a rise in temperature, expansion, evaporation, or other physical change.
incorporate—to unite substances.
inject—to insert by force into something.
iodonium—any onium compound (ion) containing an iodine atom carrying a positive charge.

light—electromagnetic radiation to which the organs of sight react, ranging in wavelength from approximately 400 to 700 nm and propagated at a speed of approximately 299,972 km/sec.

lithium ion battery—a type of rechargeable battery in which lithium ions move from the negative electrode to the positive electrode during discharge and back when charging.

major diffraction peak—a significant upward deviation on a spectral plot measured via X-Ray Diffraction.

may—is allowed and/or permitted to, in at least some embodiments.

metal—a solid material that is typically hard, shiny, malleable, fusible, and ductile, with good electrical and thermal conductivity (e.g., iron, gold, silver, copper, and aluminum, and alloys such as brass and steel).

method—a process, procedure, and/or collection of related activities for accomplishing something.

mix—to combine two or more substances.

molecule—a smallest unit of a chemical compound.

multi-layer device—a device that comprises a component made via sequential deposition of groups of molecules of different substances on a substrate or base.

nanocarbon—carbon nanoparticles.

nanofiller—a doping agent distributed in the matrix of a composite, whose individual elements have at least one of their dimensions in the nanoscale.

nanoparticles—solids that have a maximum dimension between 1 and 100 nanometers.

nanoplatelet—a disk-shaped nanoparticle.

nanotube—a nanoparticle of carbon that comprises a substantially cylindrical portion.

nanowire—a nanostructure, with a diameter on the order of a nanometer ($10^{-9}$ meters) and having a ratio of the length to width being greater than 1000.

opaque—substantially impervious to light transmission.

organic—derived from living matter.

oxidizing agent—an element or compound in a redox reaction that absorbs an electron donated by another species.

particle—a tiny piece of matter.

particle size—a largest dimension of a solid minute portion of matter.

pharmaceutical powder—a substance comprising fine particles that is used by humans to treat one or more health issues.

physically—not via any significant chemical reaction.

plurality—the state of being plural and/or more than one.

polymer—a substance that has a molecular structure consisting primarily or entirely of a large number of similar units bonded together.

pore size—a diameter of a hole defined by a surface.

precursor—a chemical compound preceding another.

predetermined—established in advance.

pressure—the exertion of force upon a surface by an object, fluid, etc., in contact with it.

printing—the production of books, newspapers, or other printed material.

produce—to make.

provide—to furnish, supply, give, and/or make available.

react—to transform one set of chemical substances to another.

reaction chamber—an enclosed vessel in which one set of chemical substances is transformed to another.

receive—to get as a signal, take, acquire, and/or obtain.

reducing agent—an element or compound in a redox reaction that donates an electron to another species.

reinforcement additive—a substance that is added to something, which substance improves a physical strength or stiffness of the something to which the substance is added.

release—to emit.

remove—to rid of resistance—an ability not to be affected adversely by something.

rice husk—a hard protecting coverings of grains of rice.

salt—any chemical compound formed from the reaction of an acid with a base, with all or part of the hydrogen of the acid replaced by a metal or other cation.

SC nanocomposite—a silica/acid composite comprising nanoparticles.

select—to make a choice or selection from alternatives.

semiconductor—a crystalline or amorphous solids with an electrical resistance that is higher than typical resistance materials, but still of much lower resistance than insulators. Their resistance decreases as their temperature increases, which is behavior opposite to that of a metal. Semiconductor conducting properties may be altered in useful ways by the deliberate, controlled introduction of impurities ("doping") into the crystal structure, which lowers electrical resistance but also permits the creation of semiconductor junctions between differently-doped regions of the extrinsic semiconductor crystal. The behavior of charge carriers, which include electrons, ions and electron holes at these junctions, is the basis of diodes, transistors and all modern electronics.

set—a related plurality.

silica hydrogel—a matrix of substantially pure silicon dioxide and water that is a free flowing and can be finely ground into a white powder.

silica/acid composite—a substance comprising a silica core and having a specific acidic shell. The substance having an X-ray diffraction chart with diffraction peaks appearing at approximately a two theta value approximately equal to 2 degrees, 27.75 degrees, and 41 degrees.

solar cell—a system that converts energy from the sun into electricity.

solvent—a substance that is able to dissolve other substances.

specific acid—an acid selected for a specific function.

substantially—to a great extent or degree.

super pores—holes defined in a surface such that the BET specific surface area of the surface is greater than approximately 1,500 square meters per gram.

supercapacitor—a high-capacity electrochemical capacitor with capacitance values much higher than other capacitors (but lower voltage limits) that bridge a gap between electrolytic capacitors and rechargeable batteries. Supercapacitors utilize use electrostatic double-layer capacitance or electrochemical pseudocapacitance. Supercapacitors have a range of capacitances between approximately 0.001 F and approximately 6,000 F. Supercapacitors have cell voltages ranging between approximately 1.4 volts and approximately 125 volts.

surface—an outer portion of a substance.

surface modified carbon—carbon black that has been chemically modified with specific functional groups. Cab-o-jet 200 and Cab-o-jet 300 are examples of surface modified carbon black, system—a collection of mechanisms, devices, machines, articles of manufacture, processes, data, and/or instructions, the collection designed to perform one or more specific functions.

thin film—ten layers or less of graphene sheets.

thiopyrylium—a cation with the chemical formula $C_5H_5S^+$.

toughness—an ability of a material to absorb energy and plastically deform without fracturing.

translucent—permitting light to pass through but diffusing the light so that persons, objects, etc., on an opposite side are not clearly visible.

two theta—a detector swing angle of an X-ray diffraction system is defined as "two theta".

via—by way of and/or utilizing.

wear—to damage by friction or use.

weight—a value indicative of importance.

wood—a hard fibrous material that forms the main substance of the trunk or branches of a tree or shrub.

X-Ray Diffraction—a method of analyzing substances that measures a scattered intensity of an X-ray beam hitting a sample as a function of incident and scattered angle, polarization, and wavelength or energy.

zeolite—a microporous, aluminosilicate mineral.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
   engraving graphene to define super pores, said super pores having an average pore size less than approximately 0.5 nanometers, wherein said engraved graphene:
   comprises at least one of thin film graphene, graphene hybrid composite, graphene nanoplatelet, and graphene flower;
   when analyzed via X-Ray Diffraction results in major diffraction peaks at two theta values of approximately 9.5 degrees, approximately 29 degrees, and approximately 44 degrees; and
   has a BET specific surface area of greater than approximately 2000 square meters per gram.

2. The method of claim 1, further comprising:
   incorporating an engraver molecule into a precursor of said engraved graphene prior to forming said engraved graphene, said engraver molecule removed from said engraved graphene after said engraving has been completed.

3. The method of claim 1, further comprising:
   embedding an engraver molecule into a precursor;
   injecting an engraver molecule into a reaction chamber; and
   causing said engraver molecule to react with a precursor at a surface of said engraved graphene.

4. The method of claim 1, wherein:
   said engraved graphene is prepared from a precursor, said precursor comprising a carbon source, a metal catalyst, and an engraver molecule.

5. The method of claim 1, wherein:
   said engraved graphene is prepared via an engraver molecule, said engraver molecule reacting chemically or physically with a precursor to form said engraved graphene, wherein said engraver molecule is a metal salt.

6. The method of claim 1, wherein:
   said engraved graphene is prepared via an engraver molecule, said engraver molecule reacting chemically or physically with a precursor to form said engraved graphene, wherein said engraver molecule comprises at least one of a corrosion agent, reducing agent, or oxidizing agent.

7. The method of claim 1, wherein:
said graphene is engraved via at least one of a corrosion agent, reducing agent, oxidizing agent, gas, and gas forming molecule.

8. The method of claim 1, wherein:
said graphene is engraved via a gas forming agent that comprises at least one of a metal or an organic acid salt.

9. The method of claim 1, wherein:
said graphene is engraved via a gas forming agent that comprises organic acid salt that comprises a diazonium salt, an iodonium salt, or a thiopyrylium salt.

10. The method of claim 1, wherein:
said engraving step causes a gas release under at least one of heat, light, or pressure.

11. The method of claim 1, wherein:
said method produces a catalyst or an electrocatalyst.

12. The method of claim 1, wherein:
said method produces particles used in a battery electrode.

13. The method of claim 1, wherein:
said engraved graphene is used to provide a charge transfer interface for a multi-layer device; and
said multi-layer device is a fuel cell, solar cell, supercapacitor, or lithium ion battery.

14. The method of claim 1, wherein:
said engraving step produces hydrogen gas.

15. The method of claim 1, wherein:
said engraving step produces at least one of a reinforcement additive and a nanofiller.

16. A method comprising:
engraving particulate matter to define super pores, said super pores having an average pore size less than approximately 0.5 nanometers, said engraved particulate matter comprising at least one of nanocarbon, a semiconductor, nanowire, cosmetic powder, ceramic powder, zeolite, catalyst, pharmaceutical powder, fluid adsorbing solid, and a gas adsorbing solid, graphite, carbon nanotube, buckminsterfullerene, carbon black, diamond, and activated carbon; wherein said engraved particulate matter:
when analyzed via X-Ray Diffraction results in major diffraction peaks at two theta values of approximately 9.5 degrees, approximately 29 degrees, and approximately 44 degrees; and
has a BET specific surface area of greater than approximately 2000 square meters per gram.

* * * * *